No. 776,965. Patented December 6, 1904.

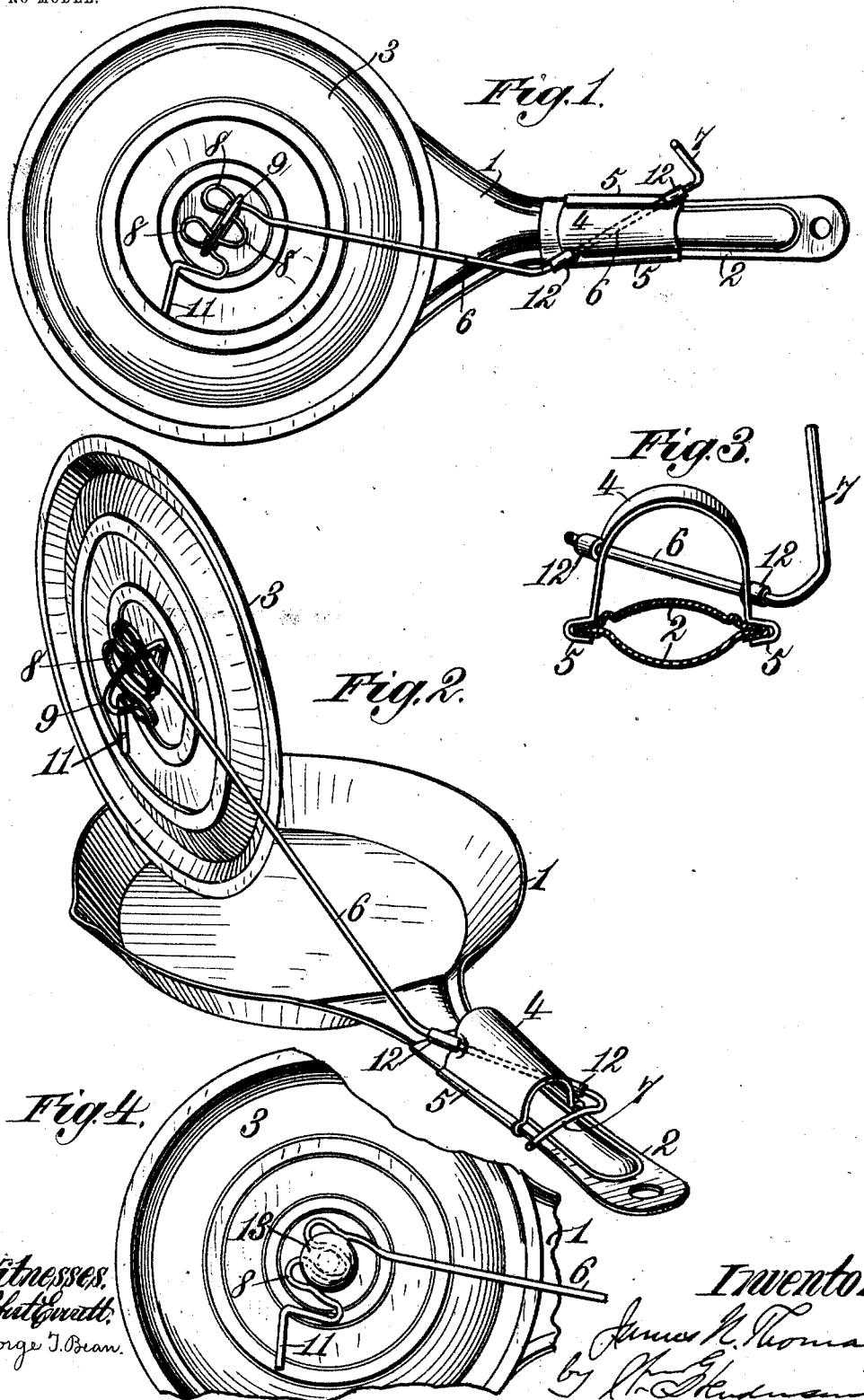

UNITED STATES PATENT OFFICE.

JAMES N. THOMAS, OF BURLINGTON, WISCONSIN.

HOLDER OR LIFTER FOR PAN LIDS OR COVERS.

SPECIFICATION forming part of Letters Patent No. 776,965, dated December 6, 1904.

Application filed March 14, 1904. Serial No. 198,087. (No model.)

*To all whom it may concern:*

Be it known that I, JAMES N. THOMAS, a citizen of the United States, residing at Burlington, in the county of Racine and State of Wisconsin, have invented certain new and useful Improvements in Holders or Lifters for Pan Lids or Covers; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to a device for manipulating the lids or covers of pans or cooking utensils; and it has for its object to provide such a device which can be readily applied to pans or covers already in use and of ordinary construction without necessitating any change in the construction of the pan or cover for the purpose and by which the lid or cover will be held in position on the pan and when necessary may be raised and lowered and tilted without the necessity of taking hold of the lid or cover.

To the accomplishment of the foregoing and such other objects as may hereinafter appear the invention consists in the construction and combination of parts hereinafter particularly described and then sought to be clearly defined by the claims, reference being had to the accompanying drawings, forming a part hereof, and in which—

Figure 1 is a plan view of a pan and cover with my device applied thereto. Fig. 2 is a perspective of the same parts, showing the lid or cover as raised and tilted. Fig. 3 is a cross-sectional view of the pan-handle, showing my device applied thereto; and Fig. 4 is a plan view of a portion of a pan and its lid and illustrating one manner of securing the holder or lifter to the lid or cover.

In the drawings, the numeral 1 designates a pan having a handle 2, and 3 designates a lid or cover, which parts may be of any ordinary and approved type of construction.

The numeral 4 indicates what for convenience I will designate as a "clamp." It consists of an arch-shaped member, preferably made of sheet-steel or other elastic or spring material and provided along its lower opposite edges with grooves or recesses 5, designed to receive the opposite edges of the pan-handle 2, so that the clamp will be secured to the handle and be free to be shifted longitudinally thereon, if desired. The member being made of spring material and arch-shaped, it may be expanded laterally, so as to accommodate it to different sizes of handles, and the elasticity of the material of which it is made will cause the clamp to be held to the handle at any position to which it may be adjusted, and it can be readily removed by sliding it lengthwise of the handle and may then be applied to the handle of another pan or utensil. Combined with this clamp is a rod 6, made, preferably, of heavy wire, which at one end is formed with a finger-piece 7, made by bending the wire at an angle to the longitudinal axis of the rod and at the other end is formed into several loops 8, which allow of compression or contraction, so as to fit within a ring 9, such as is ordinarily on a pan lid or cover, and then to expand within the ring so as to hold the lid or cover to the rod, and at the end of the looped portion of the rod is a finger 11, designed to bear against the top of the lid or cover and press against the same when the rod is turned, so as to assist in tilting the lid or cover. The rod 6 passes diagonally through the clamp 4, and preferably in an upwardly-extending direction, as illustrated, and is free to be rotated and may be provided with shoulders 12 at opposite sides of the clamp, so as to prevent or limit endwise movement of the rod in its bearings in the clamp. The rod is bent so that the portion which extends through the clamp will lie or extend obliquely to the portion which extends from the clamp to the looped end, which is connected to the lid or cover, so that when the rod is turned or rotated in the clamp the portion to which the lid or cover is attached will elevate and at the same time turn or tilt the lid or cover, edge up, as illustrated in Fig. 2 of the drawings. When in this position, the finger-piece 7 by bearing against the handle 2 will prevent the lid or cover from being carried any farther back, so that it will stand in the upright position illustrated. It will be brought into this position from that shown in Fig. 1 by simply pressing the thumb against the finger-piece 7, so as to move the finger-piece from the right to the left, thereby turning the rod or lifter 6 and elevating the lid to the position indicated in Fig. 2. It can be held at any position between that shown in Fig. 1 and that shown in Fig. 2 by the pressure of the thumb on the finger-piece 7, and by pressing down on the finger-piece 7, so as to hold it to the position shown in Fig. 1, the whole pan can be tilted and the lid or cover be held in position on the pan. When the lid or cover is in the position shown in Fig. 2, any condensation on the same will drip or run into the pan instead of onto the stove or table or elsewhere.

This device avoids the necessity of taking hold of a hot lid or cover in manipulating the same and also enables the cover to be held to the pan while moving or tilting the pan and also enables the cover or lid to be raised partially or wholly, as desired, in examining the pan's contents, and, further, directs all drippings from the cover back into the pan.

The device can readily be taken from off one pan and applied to another and affords a most simple and efficient means for holding the cover in place or for lifting it and holding it raised in a tilting or other position. It can be made at comparatively small cost, and thus be obtainable by all classes, and will be found to be a most useful household article for culinary or cooking purposes.

The looped portion 8 admits of the lifting-rod being connected to the lid not only in the manner illustrated in Fig. 2, where the lid has a ring 9, but also admits of its attachment as shown in Fig. 4, where the lid has a knob 13 instead of a ring, the shank of the knob in such case being received in one of the loops 8 and held by the spring-pressure of the loop.

I have illustrated and described with particularity the preferred details of construction of the several parts; but it is obvious that changes can be made and essential features of my invention be retained.

Having described my invention and set forth its merits, what I claim is—

1. The holder and lifter for pan lids or covers, comprising the arch-shaped clamp for attachment to the pan-handle, and the rod having one portion lying obliquely to another portion and extended diagonally through and rotatably mounted in the clamp, whereby as the rod is rotated a lid attached to it will be raised and tilted, substantially as described.

2. The holder and lifter for pan lids or covers, comprising the rod having one portion bent obliquely to another portion thereof and formed with a finger-piece at one end, the portion of the rod extending from the handle-attaching portion being formed for attachment to the middle portion of the lid or cover, and means for rotatably attaching the obliquely-extending portion to a pan-handle, whereby the lid or cover may be lifted and tilted and have its lower edge lie within the dimensions of the utensil to which the cover may be applied, substantially as described.

3. The holder and lifter for pan lids or covers, comprising the clamp, and the rod passed through and rotatably mounted in the clamp, said rod having one portion extending obliquely to another portion and provided at one end with a finger-piece and at the other end formed for attachment to a cover or lid, substantially as described.

4. The holder and lifter for pan lids or covers, comprising the arch-clamp, and the rod having one portion extending obliquely to another portion and passed diagonally through the clamp in an upwardly-inclined direction and rotatably mounted in the clamp, substantially as described.

In testimony whereof I affix my signature in presence of two witnesses.

JAMES N. THOMAS.

Witnesses:
  C. L. GRAHAM,
  GEO. C. DENNISTON.